March 9, 1965 E. J. BURKE 3,172,387
SOLDERING APPARATUS
Filed May 9, 1960 10 Sheets-Sheet 4

INVENTOR
EARL J. BURKE
BY *Connolly and Hutz*
HIS ATTORNEYS

March 9, 1965 — E. J. BURKE — 3,172,387
SOLDERING APPARATUS
Filed May 9, 1960 — 10 Sheets-Sheet 5

INVENTOR
EARL J. BURKE
BY Connolly and Hutz
HIS ATTORNEYS

March 9, 1965     E. J. BURKE     3,172,387
SOLDERING APPARATUS
Filed May 9, 1960     10 Sheets-Sheet 8

INVENTOR
EARL J. BURKE
BY *Connolly and Hutz*
HIS ATTORNEYS

United States Patent Office 3,172,387
Patented Mar. 9, 1965

3,172,387
SOLDERING APPARATUS
Earl J. Burke, Stamford, Vt., assignor to Sprague Electric Company, North Adams, Mass., a corporation of Massachusetts
Filed May 9, 1960, Ser. No. 27,562
16 Claims. (Cl. 113—127)

The present invention relates to a soldering apparatus for automatically soldering the ends of cylindrical articles. In particular, the invention relates to a soldering apparatus for soldering the ends of small rolled capacitor sections which are commonly and extensively used in a great variety of electrical appliances such as radios, television sets, etc.

With the use of capacitor sections in electrical appliances, a conductive member such as a conductive wire or lead must first be affixed through a solder connection to each end of the capacitor section. Therefore, during the capacitor section manufacture, an amount of solder is applied to each end of the capacitor section to seal off the ends of the capacitor section and to provide solder supports to which the conductive members may be attached.

The manufacturer applies the conductive members to the ends of the capacitor sections by contacting the solder seals with a heated member to soften the solder while holding a conductive member such as a wire in contact with the solder seal. Upon cooling, the conductive members are thoroughly anchored to the ends of the capacitor section.

In the past, the capacitor section manufacturer has found it necessary to apply the solder to the capacitor section ends by hand methods. Heretofore, the manufacturer has not been able to provide a satisfactory soldering apparatus whereby the ends of the capacitors may be automatically sealed with solder. The main difficulty has been that the heated and softened solder was pulled away from the capacitor section ends by the solder applicators.

It is, therefore, one object of the present invention to provide a novel and improved soldering apparatus which automatically applies solder to the ends of cylindrical articles such as capacitor sections in a finished, professional manner.

A further object of the invention is to provide a soldering apparatus of the above object wherein capacitor sections are rapidly processed through the soldering apparatus.

Still another object of the invention is to provide a soldering apparatus of the above objects wherein the capacitor sections are automatically fed in progressive manner and in timed relationship to the soldering stations.

Another object of the invention is to provide a soldering apparatus of the above objects wherein a supply of heated and softened solder is continuously and simultaneously fed to a pair of opposed soldering stations.

Among other objects, a further object of the invention is to provide in the soldering apparatus of the above objects, automatic capacitor section discharge means for discharging the capacitor sections from the apparatus after the capacitor section ends have been soldered.

Other objects and advantages of the invention will become apparent from a study of the following description and drawings wherein.

Briefly, the soldering apparatus comprises a vibratory supply hopper into which the capacitor sections are initially loaded and from which they are fed in progressive manner toward the main body of the soldering apparatus secured to a stable frame. A vibratory rail which supports a feed tube is secured to the table frame. The tube receives the capacitor sections from the supply hopper and passes them toward a turret wheel conveyor for the capacitor sections, which conveyor is also supported by the table frame. Preferably, although not essential, means are provided in connection with the feed tube for propelling the capacitor sections in timed relationship to a turret wheel. A series of ferrules extend through the turret wheel around the peripheral portion of the wheel progressively receiving the capacitor section propelled from the tube as the wheel rotates. A pair of spaced apart and opposed solder applying discs are rotatably supported adjacent the turret wheel in such a manner that the peripheral portion of the turret wheel which houses the ferrules passes between the disc peripheries so that the ends of the capacitor sections housed in the ferrules will contact the peripheries of the soldering discs as the wheel rotates therebetween. To prevent the solder from being pulled away from the capacitor section ends after application, it is important that the path of contact of the capacitor sections with the disc peripheries does not extend beyond the center lines of the discs. Heating means are provided for heating the discs and solder supplying means are supported on the table frame adjacent the soldering discs to continuously apply a solder film to the periphery of each solder application discs. Air expulsion means directed toward the path of travel assumed by the ferrules housed in the turret wheel conveyor expels the capacitor sections from the ferrules after solder has been applied to the capacitor section ends.

The capacitor sections are fed into the conveying turret wheel under the action of pneumatic means. The sections are introduced into ferrules in the turret wheel one at a time and timed to the rotation of the wheel so as to avoid jamming of the sections together or missing a ferrule.

Figure 1:
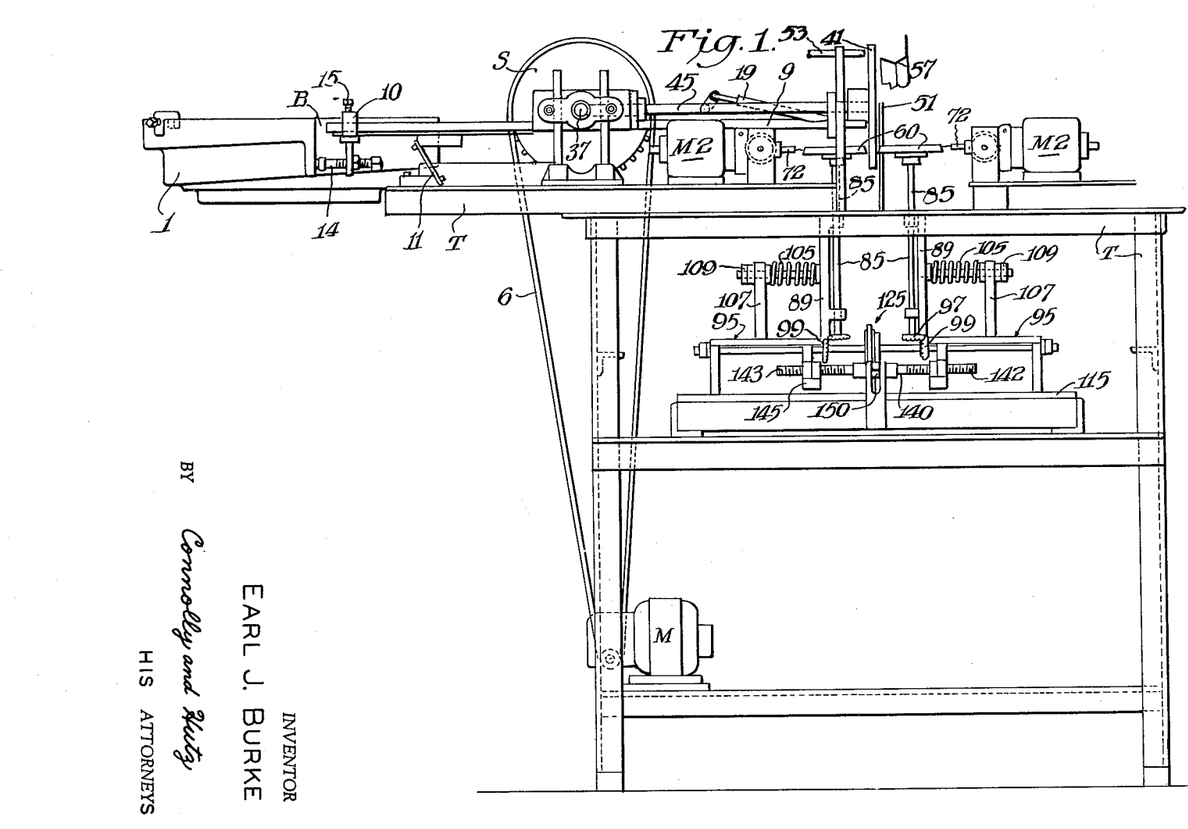
FIG. 1 is a side view of the apparatus.
Figure 2:
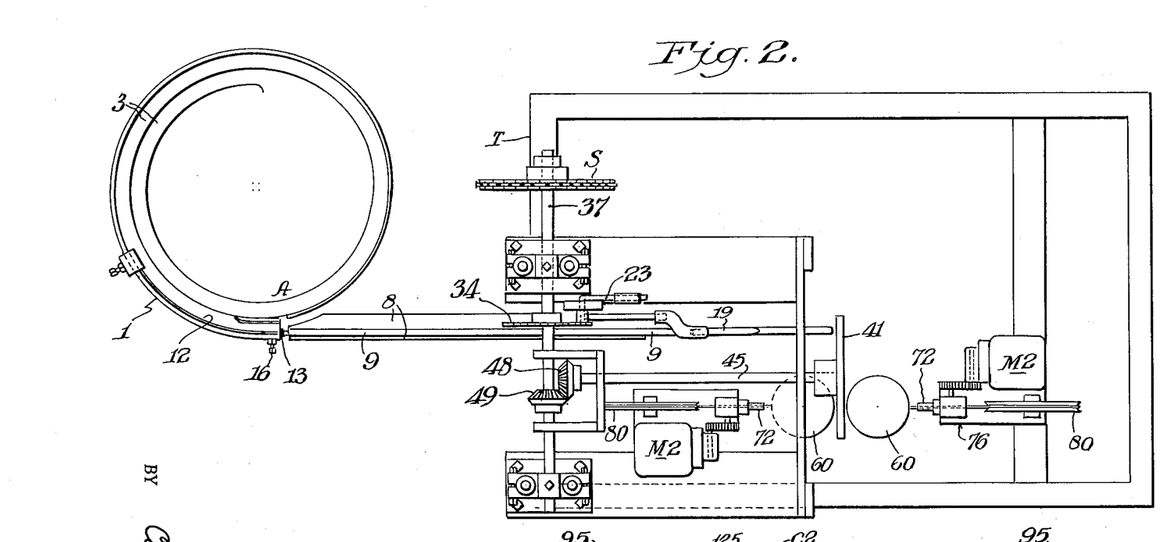
FIG. 2 is a top view of the apparatus.

Referring now more particularly to FIGS. 1 and 2 of the drawings, a table frame T is provided for supporting the various cooperating members and elements of the apparatus. The cylindrical articles such as capacitor sections 2 (see FIG. 11) are initially loaded into a vibratory supply hopper 1. As seen more clearly in FIG. 2, an ascending spiral ledge 3 is provided along the interior wall of the hopper 1. As the hopper 1 is vibrated, the capacitor sections 2 gradually work themselves up the spiral ledge 3 to the top of the hopper to a point indicated by arrow 5 in FIG. 3. Since the vibratory hopper is a commercial item and forms no part of the present invention except in combination with the other elements of the apparatus, the specific make-up of the hopper has not been shown. Any suitable commercial vibratory hopper such as that commercially sold by the Syntron Company of Homer City, Pennsylvania, and known as "Model C" may be used to provide the proper vibratory motion to the hopper 1. From point 5 of the hopper 1, the capacitor sections 2 pass to a rail 8 which supports a feed tube 9 and which is shown more clearly in FIGS. 6 and 6A of the drawings.

Figure 6:
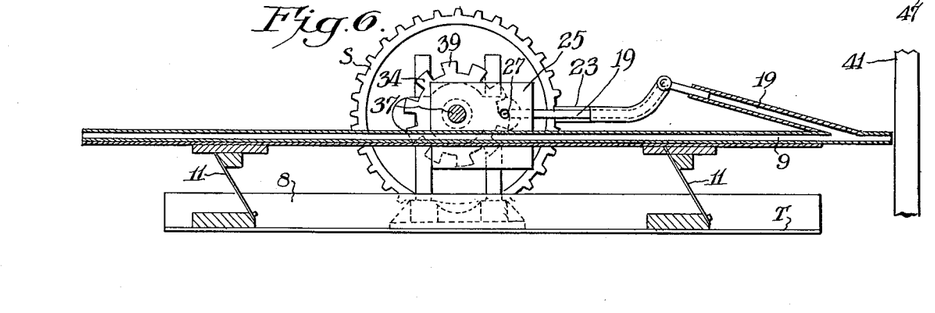
FIG. 6 is an elevation of the feeding means of FIG. 5.
Figure 6A:
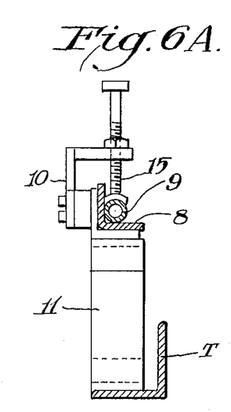
FIG. 6A is a section taken along lines 6A—6A of FIG. 4.

As seen in FIGS. 6 and 6A, the rail 8 is supported by spring strip mountings 11 secured to the table frame T. The rail 8 shown is of L-shape and is supported so that one leg of the L extends outwardly and the other extends upwardly. However, it may take other forms such as V-shaped rail. A section of tubing, preferably of a plastic nature, is supported by the rail 8. The feed tube 9 is preferably formed of a clear plastic material so that the progress of the capacitor sections passing through the tube may be observed.

Figure 3:
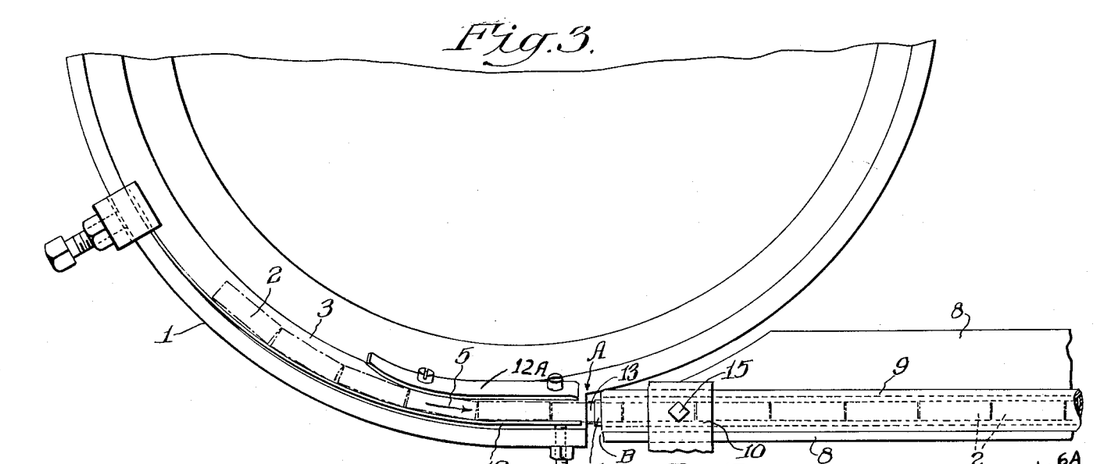
FIG. 3 is a top view in detail of the connection between the supply hopper and the feed chute.
Figure 4:
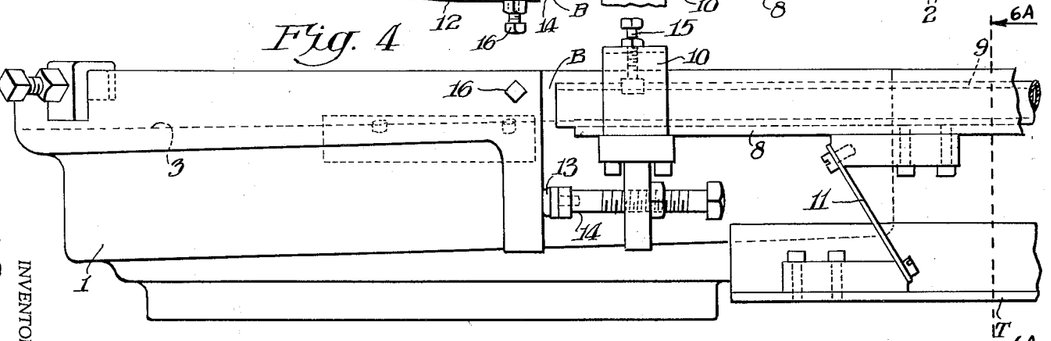
FIG. 4 is a side elevation in detail of the connection between the supply hopper and the feed chute as seen in the direction of the arrows in FIG. 3.

The connection between the hopper 1 and the tube 9 is shown at point A in the plan view of FIG. 3 and the side view of FIG. 4. As seen in FIG. 3, this junction is adjacent to the end of the spiral ledge 3 indicated by the arrow 5, as mentioned above. The sections move across the ledge 3 and into the tube 9. This movement is automatic as provided by the proper vibratory motion. This vibratory motion is transmitted to the tube 9 so as to continue the progressive advancement of the sections 2 through the tube 9 and away from the supply hopper 1. In this manner, the sections 2 are fed down the tube 9 to the point where the pneumatic feeding means carries them further, as described in greater detail below.

The joint at A is shown in detail in FIGS. 3 and 4. The hopper 1 is shown in contact with a bumper 14. The bumper 14 is attached to the rail 8 by a bracket 10. As seen in the plan view of FIG. 3, the bumper 14 has a resilient face 13 which comes into contact with the hopper 1 at the end of the spiral ledge 3. In the side elevation of FIG. 4, the positioning of the bumper 14 beneath the rail 8 shows the relationship between the parts. A space is provided between the end of the spiral ledge 3 and the end of the tube 9. This space indicated at B is substantially less than the axial length of the shortest section 2 to be fed across the connection. Referring again to FIG. 3, the hopper 1 is provided with a guide plate 12. The guide plate 12 is clamped to the upright side of the hopper 1 and is a long leaf of a resilient material. A set screw 16 positioned in the side of the hopper 1 bears adjustably against the guide plate 12 to vary its lateral position across the end of the spiral ledge 3 and the adjacent opening of the tube 9. The sections 2 shown on the ledge 3 are thus adjustably positioned with respect to the center line of the adjacent tube 9 in their travel across the opening B in the connection A. An inner plate 12A is attached to the ledge 3. The plate 12A conforms to the curvature of the wall of the hopper 1 but only at the end removed from the opening B. At the end adjacent to the opening B, the plate 12A forms a tangent to the curve of the hopper wall. The plate 12A acts as a deflector to remove the excess sections 2 in the movement of the sections 2 toward the joint between hopper 1 and tube 9. The sections which are piled up on top of the sections destined to feed into the tube 9 topple over the upper edge of the plate 12A and fall back into the hopper 1. It is noted that the bumper 14 is axially movable in the bracket 10. This permits adjustment of the pressure applied to the rail 8 through the bumper 14. As the rail 8 is supported by the spring strip mountings 11, the throw of the rail 8 by the vibrations of the hopper 1 will be influenced by the degree of deflection of the mountings 11 created through the adjustment of the axial positioning of bumper 14 in the bracket 10. A threaded clamp 15 is provided for holding the end of the tube 9 in the bracket 10. Vibratory motion in the rail 8 transmitted from the hopper 1 advances the sections 2 along the tube 9.

Figure 5:
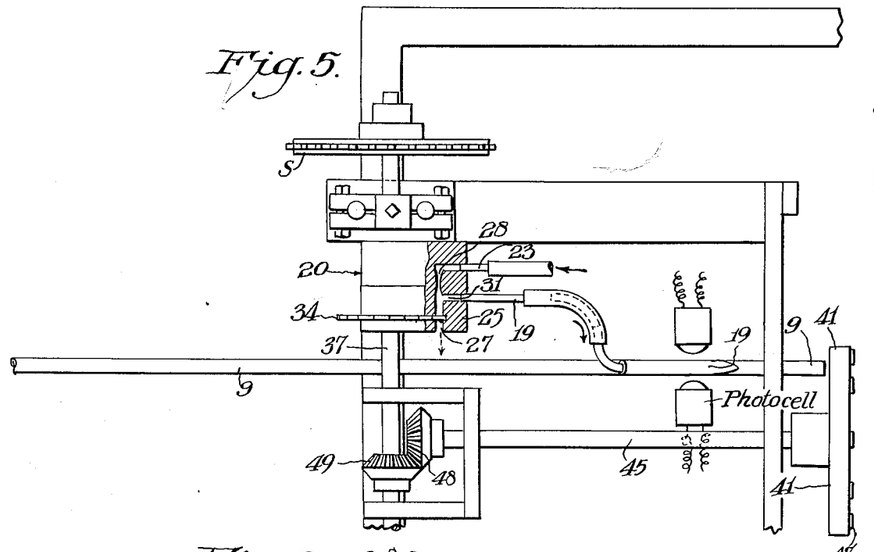
FIG. 5 is a top view of the feeding means for automatically feeding the capacitors toward the soldering station.

As seen in FIGS. 5 and 6, an air line 19 is connected in communicating relationship with the tube 9 at or adjacent to the discharge end of the tube, the purpose of which is explained below.

As mentioned above, the sections 2 are preferably advanced toward the soldering stations in timed relationship by a timing assembly. Such timing assembly, however, is not necessarily essential for the successful operation of the invention. This timing assembly generally indicated as 20 in FIG. 5 generally consists of a main air supply 23 partially housed in support block 25 and through which air is continuously passed to be alternately discharged into the atmosphere from the discharge end 27 of the main supply line 23 and into the air line 19 through a connection 31 formed within the block 25 and which opens into the main supply line 23 at a point prior to the discharge end 27 of the line 23.

In one form of regulating the pneumatic advancing means, the air is intermittently blown through the air line 19. A means for creating this intermittent blasting of air through line 19 is illustrated in FIGS. 5 and 6. In FIG. 5, the air is alternately channeled from the main supply line 23 through the connection 31 and air line 19 by a blade wheel 34 which is supported upon a rotatable shaft 37. FIG. 1 shows the shaft 37 journalled to the frame T. The shaft 37 is turned by a chain 6 which engages sprocket S on the shaft 37. The chain 6 is driven by the motor M. As seen in the plan view of FIG. 2, the sprocket S turns on a horizontal axis which is the shaft 37. The air control means illustrated in FIGS. 5 and 6 is not shown in FIG. 2. The blade wheel 34 is mounted on the shaft 37 between the sprocket S and other gearing described in greater detail below in connection with FIG. 2. Referring again to FIG. 6, the wheel 34 has radially extending, spaced apart blades 39 and, as shown in FIG. 5, the blade wheel 34 is so mounted that the blades pass through the block 25 and the main supply line 23 to periodically cut off the main air supply line 23 at a point beyond the air line connection 31 whereby amounts of air are periodically shunted into the air line 19. The air under pressure enters the tube 9 on the track 8 giving the leading section 2 a push which rapidly propels the section toward a turret wheel 41 which receives the section in a ferrule 47 and conveys it to a soldering station.

A preferred means for controlling the timing of the feed of sections 2 to the revolution of the ferrules 47 is described. Referring first to FIG. 2, the tube 9 extends from the hopper 1 to the turret wheel 41 and carries the sections 2 in their transfer from the hopper 1 to the turret wheel 41. The sections 2 to be processed in this, apparatus exhibit a wide variety of physical characteristics. They vary in shape, both in length and girth, in weight and in softness. In turn, these characteristics vary the friction between the sections and the inner surface of the tube 9 and also the volume of the internal bore of tube 9 occupied by the sections. The sections are moved through the tube 9 by a combination of forces. The one force that initially feeds the sections 2 into the tube 9 is the vibratory shaking of the sections 2 derived from the motion of the hopper 1. The other force is air pressure or suction exerted on the sections 2 while within the tube 9. The air pressure is applied to the sections 2 from the connection A of the tube 9 (see FIG. 3) at the hopper 1, through the air line 19 (see FIG. 7) and also through apertures 151 formed in the tube 9 adjacent a junction C of the air line 19 with the tube 9 (see FIG. 8).

The sections are moved into the turret wheel 41 so that the ferrules 47 can receive the sections from the tube 9 individually and successively without an interruption which would cause one of the ferrules 47 to pass empty to the soldering station. It is the purpose of the movement thus to provide the sections so that they will be regularly presented to the turret wheel 41 and so that any interruption of this regular presentation will be avoided. As pointed out above, a general movement of the sections 2 is provided by the vibration of the tube 9. In addition, the pneumatic advancement of the sections is effected by means of the air stream which is supplied through the tube 19. These combined means of movement must result in a continuous feed which is free of clogging or jamming. It must be rapid and so arranged as to continually present a section 2 to the turret wheel 41 at the phase in the rotation of the wheel 41 during which an empty ferrule 47 is presented to the end of the tube 9.

The pneumatic advancement of the sections 2 acts upon the sections 2 by a balance of the various factors providing air pressure on the sections. These factors are the cross-sectional area of the feeder tube 19, the area of the apertures 151, the velocity of the air and the angle of forced introduction of the air into the feeder tube as well as the relative proportions of the individual sections. As a result of this balance there is provided an effective, section-moving pneumatic action at the end of the tube 9 adjacent the turret wheel 41. This pneumatic action acts upon the sections 2 and operates on the sections 2 either one at a time or on more of the sections 2 at one time. It acts upon the sections 2 to move them into position for reception by an empty ferrule 47. For example, the air which is forced from the air line 19 into the tube 9 blows out through the end of the tube 9 and thus exerts a pressure on a section 2 sitting in the end of the tube 9 so that the section 2 may be moved into the ferrule 47 brought up with the motion of the wheel 41.

Figure 7:
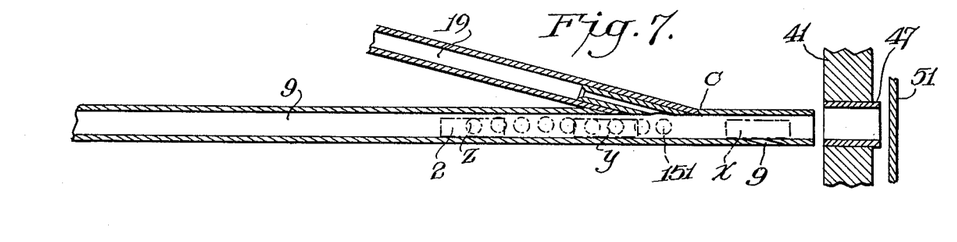
FIG. 7 is a longitudinal section showing in detail the air line in the feeding means.

In FIG. 7 the air line 19 and its joint C with the tube 9 are shown in juxtaposition with the turret wheel 41. The air line 19 makes the joint C with the tube 9 at an acute angle $\theta$ so that the forced air stream is directed into the feeder tube 9 toward the open end. This directed angle of the air line 19 and its introduced air stream may be varied to adjust the balance of factors which provide air pressure on the sections. This directed angle determines the division of the forced air stream as it enters the feeder tube 9. The smaller the angle $\theta$ of FIG. 7, the greater will be the proportion of the forced air stream directed through the open end of the feeder tube 9 and the less will be the proportion of the forced air stream which turns up the tube toward the apertures 151. Conversely, increasing the angle $\theta$ increases the proportion of forced air stream moving away from the open end of the tube 9. As will be described in greater detail below, the angle $\theta$ also influences the flow of air into the tube 9 through the apertures 151 during the intake of air into the air line 19.

Figure 8:
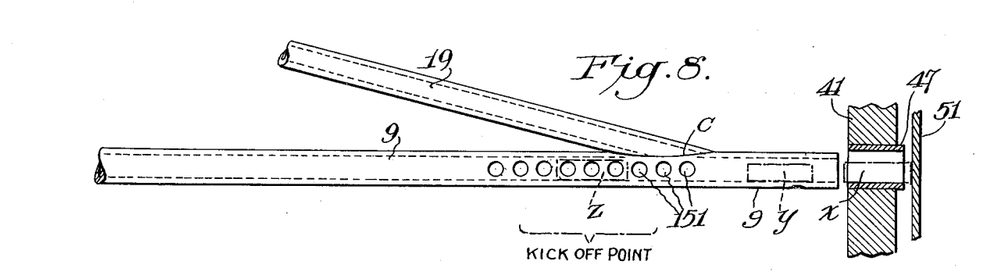
FIG. 8 is a longitudinal elevation of the air line of the feeding means in one stage of operation.

As shown in FIG. 8, the tube 9, according to one form of this invention, is provided with the apertures 151. With this form of section conduit the pneumatic action provides a seizing action which interrupts the travel of the sections 2 through the tube 9 and causes them to be moved to the turret wheel 41 in two stages. As pointed out above, the pneumatic action can act on one section at a time or on more than one section at a time. In either case, the sections 2 are moved down to the apertures 151 where they remain until the seizing action operates on one or more of the sections. At this point the sections are held from further advance toward the open end of the tube 41. The seizure is effected by the passage of air within the tube 9. Air is introduced into the tube 9 through the air line 19 to propel a section from the end of the tube toward or into the turret wheel 41.

For a description of the pneumatic action, reference is first made to FIG. 5. The blade wheel 34 is shown for intermittent interruption of the air which is introduced from the main line 23. When a blade 39 blocks the discharge end 27 the air is blown through the air line 19 to provide the air pressure mentioned above. This has an effect on the apparatus as shown in FIG. 7 of blowing from air line 19 into the tube 9 and out through the end of the tube 9 adjacent the turret wheel 41. A small portion of the forced air stream escapes through apertures 151. When the blade wheel 34 has no blades 39 blocking the discharge end 27, the air from the line 23 blows out through the discharge end 27 and does not blow down the air line 19. Rather a venturi 28 provided in the block 25 causes a reduced pressure at the connection 31 when the air is blowing directly out through the discharge end 27. This venturi sucks air back up tube 19 into the block 25 and thus reverses the air flow through air line 19 during this phase of the pneumatic action.

Referring to FIG. 7 the reverse flow of air in the air line 19 is drawn from the tube 9 through the open end of the tube and in lesser proportion through the apertures 151. Thus the air flows first one way and then aonther through the air line 19 by a transpiration out and an intake in the open end of the tube 9.

The row of apertures 151 provide a kick-off point for the sections 2 in their travel down the tube 9 to the turret wheel 41. This kick-off point is the point at which the pneumatic action arrests the vibratory motion of the sections 2 and the point from which the pneumatic action moves the sections for presentation to the turret wheel 41. The transpiration phase blows a section from the tube 9 into an awaiting ferrule 47 and also during the transpiration phase of the pneumatic cycle the next succeeding section or sections are moved from the kick-off point at apertures 151 up to the end of the tube 9. During the intake phase of the pneumatic cycle the sections 2 are held stationary in the tube 9 including those sections which have reached the kick-off point. As a result, the sections 2 are held at the kick-off point and at the end of the tube wherever they are located at the inception of the intake phase. The intake of air through apertures 151 is adjusted by the balance of factors so that it leaves the next succeeding section at the kick-off point undisturbed.

Figure 9:
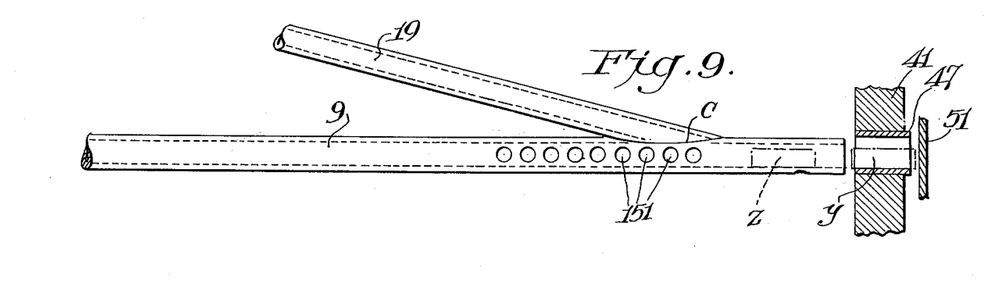
FIG. 9 is a longitudinal elevation of the air line of the feed means at another stage in the operation.

Referring to the successive movement of the sections 2 as illustrated in FIGS. 7–9, FIG. 7 shows an axial sectional view of the tube 9 in which three capacitor sections 2 are identified as X, Y and Z and are at points of relative advancement toward the turret wheel 41. The section X is ready for moving into the ferrule 47 of the turret wheel 41. The section Y is held at the kick-off point of apertures 151 and Z has not yet reached the kick-off point. When air is injected into the tube 9 from the air line 19 during the transpiration phase, the section X which blocks the end of tube 9 partially closes the end of the tube 9 and causes back pressure within the tube 9. This back pressure escapes through the apertures 151 and serves to create a back pressure within the tube 9 up to the point of the row of apertures but not further up the tube than these apertures.

When the turret wheel 41 rotates to place an empty ferrule 47 at the end of the tube 9, the section X moves from its blocking position in the end of the tube 9. While this is taking place the discharge end 27 is, of course, blocked by a blade 39 to provide the current of air through the line 19 for the transpiration phase. With the removal of section X from the end of the tube 9, the section Y is moved up to the end of the tube 9 as shown in FIG. 8. The transpiration phase closes with the section Y moved up to the end of tube 9 and the section Z moved into the kick-off point. The section Z is held at the kick-off point by the back pressure in the forced current of air caused by the section Y blocking the end of the tube 9. Referring to FIG. 5, the turret wheel 34 rotates to permit the discharge of air through the discharge end 27 and creates the intake phase of the pneumatic cycle. The intake of air through the apertures 151 and the end of the tube 9 as balanced to maintain the section Z at the kick-off point are shown in FIG. 8. In this balance so little air is drawn in through the apertures 151 that it leaves the section Z at the kick-off point. It will be understood that this balance is influenced by the angle θ at which the air line 19 is joined to the feeder tube 9. In this condition sections Y and Z await the rotation of turret wheel 41 and the approach of the next succeeding empty ferrule 47. As the ferrule 47 approaches the tube 9 end, the transpiration phase sets in by the blocking of the discharge end 27 with the next succeeding blade 39 as described above. During this next transpiration phase the section Y is moved into the next succeeding ferrule 47 and the section Z moves into the end of the tube 9 as shown in FIG. 9.

The sections are moved up under pneumatic action either one at a time or in a group from a point which has been referred to as the kick-off point. The kick-off point is the point at which the pneumatic action of the air pressure within the tube 9 takes hold of the sections and moves them toward the turret wheel 41. It is important that, in the synchronized action of the apparatus of this invention, the seizing of the sections not occur until the end of the tube is ready to receive the sections thus delivered. At the same time, it is important that they be moved against the turret wheel 41 as soon as the end of the tube 9 is available to receive the individual section. Accordingly, by moving the section to the end of the tube 9, after the preceding section has been taken up by the preceding ferrule 47, each section is presented at the tube 9 end at the earliest possible interval. The variety of sections 2 and the effect of this variation on the operation of the feed device makes necessary a feed means which allows an adaptability in the seizure and advancement of the sections. An automatic adjustment of the kick-off point will permit adaptation of a single feed means to sections of varying characteristics. In this way, the more sluggish sections can be fed to the ferrules 47 with the same alacrity as the more mobile sections. At the same time, the sections advancing down the tube 9 under the vibratory action are not subjected to excessive pressure or distortion.

In FIG. 7, the presence of section X between the apertures 151 and the end of the tube creates a back pressure which will retain capacitor section Y at the kick-off point. The ferrule 47 for section X is seen at the end of tube 9. The section Y is advanced ready for delivery to the turret wheel 41 before the next ferrule 47 arrives as shown in FIG. 8. This insures positive blocking of the open end of tube 9 to retain section Z at the kick-off point and also insures the reception of the section Y in the ferrule without crushing. It has been found helpful, but not necessary, to provide a hesitation in the turret wheel advance at the instant of positioning the capacitor sections 2 in their respective ferrules 47.

In FIG. 8, the section Y is shown in the position of section X in FIG. 7. Meanwhile, section Z has assumed the position of section Y in FIG. 7. The advanced section Y now blocks the opening of the tube 9 and causes a reversal of the air flow back through the apertures 151. This serves to hold up the next succeeding section Z as the advanced section Y had previously been held up by its respective preceding section X. Thus, it is seen that the sections 2 may be fed one at a time from the kick-off point at the apertures 151. The sections 2 may be successively positioned in the end of the tube 9, ready and waiting for their respective ferrules 47. It will be understood that the sections 2 may be moved in groups as well as individually.

The type of movement through the tube 9 which is desired of the sections 2 falls into two general categories. The first is the general movement of the sections 2 down the tube 9 from the hopper 1. The second is the more specific movement of the sections 2 from the tube 9 into the ferrules 47 positioned around the wheel 41. The purpose of the first movement is simply to place the sections 2 individually and successively at a point where the second movement will deliver them to the turret wheel 41 in timed relationship to the ferrule revolution. The speed of operation attainable with this device requires that this feed with its two phases be continuous and free of clogging or jamming which would cause an interruption in the feed of the sections 2 and the soldering of the sections 2. At the same time, the constant positioning of the sections 2 must be rapid and in synchronism with the revolution of the ferrules 47 past the end of the tube 9.

The turret wheel 41 is supported by a shaft 45 journalled in the frame T and driven by bevel gear 48 which meshes with a drive gear 49 secured to the aforementioned drive shaft 37 (see FIG. 2). The faces of the turret wheel 41 lie at right angles to the axis of the feed tube 9.

Figures 10, 10A, 11, 11A:
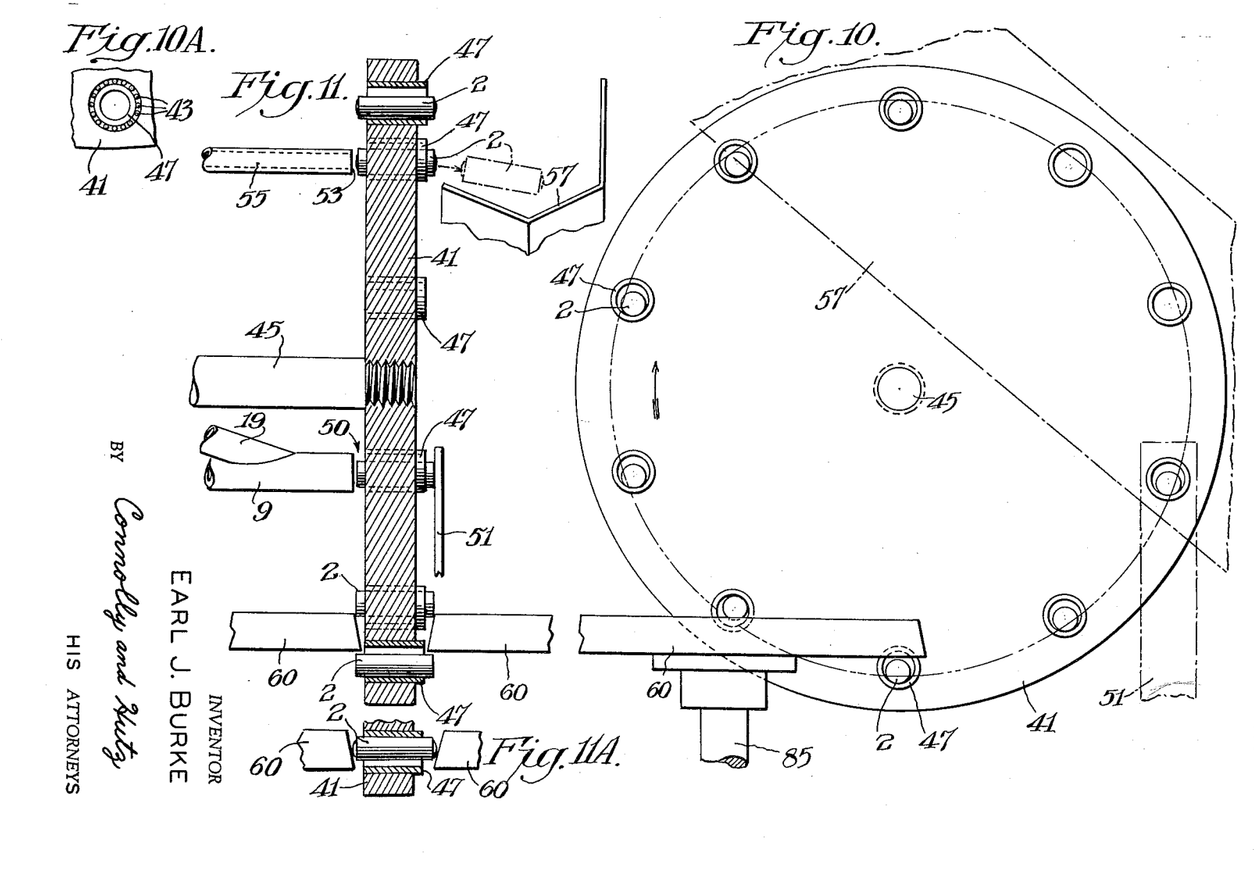
FIG. 10 is an end view of the conveying means for conveying the capacitor sections to, through, and beyond the soldering stations.
FIG. 10A is an elevation of a portion of the conveyor of FIG. 10 showing a bearing detail.
FIG. 11 is a side view partially in section of the conveyor of FIG. 10.
FIG. 11A is a partial side view partially in section of the conveyor of FIG. 10 showing a different position from FIG. 11.
Figure 12:
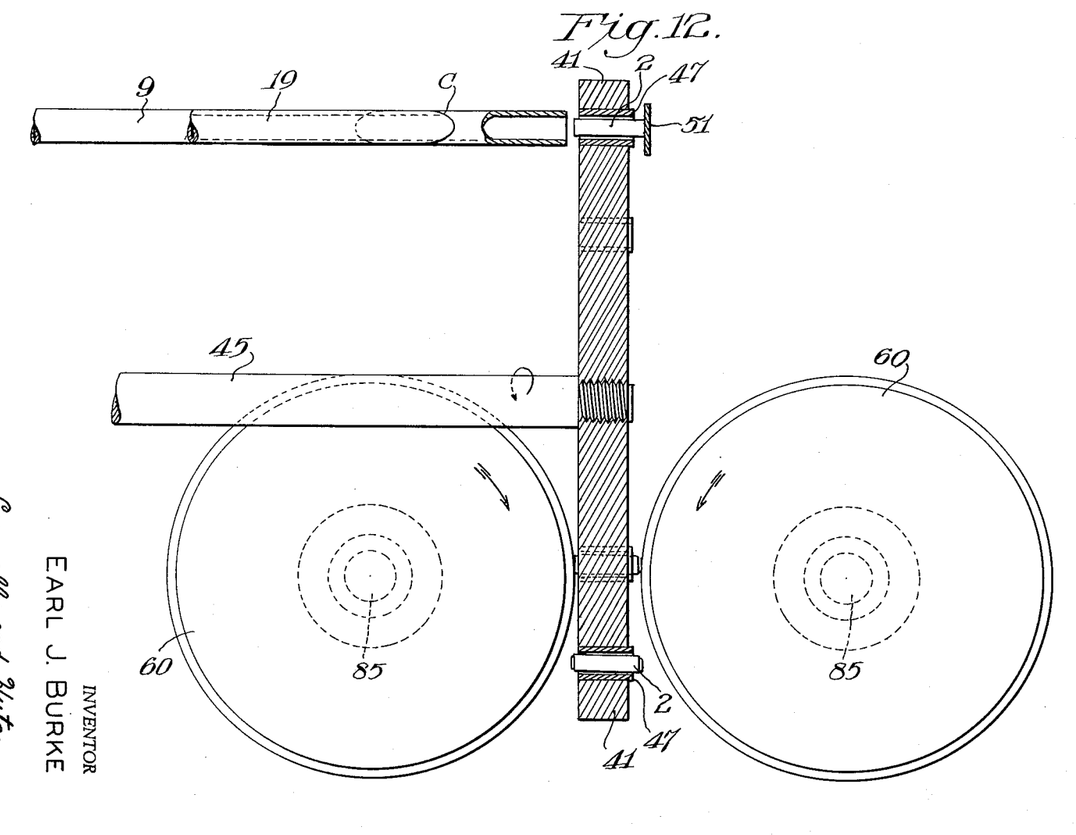
FIG. 12 is a plan view of the end of the feeding means, the conveyor, and the soldering wheels.

The structure of the turret wheel 41 is shown in greater detail in FIGS. 10, 10A, 11, 11A and 12 of the drawing. As seen therein, a plurality of ferrules 47 extend around the peripheral portion of the turret wheel 41 and completely through the turret wheel thickness so that their axes lie parallel to the axis of the wheel supporting shaft 45. FIG. 10A shows a portion of the turret wheel in detail to illustrate the modification in which the ferrules 47 are mounted by bearings 43 in the turret wheel 41. The bearings 43 permit the ferrules to rotate on their axes within the turret wheel 41. As seen more clearly in FIGS. 10, 11 and 12, the ferrules 47 are of shorter length than the sections 2 and are uniformly spaced around the peripheral portion of the turret wheel 41. With this arrangement, the ends of the sections extend slightly beyond the ferrules 47. The section loading position on the turret wheel 41, that is, the point at which the ferrules 47 of the turret wheel 41 progressively receive the sections 2 being propelled from the tube 9, is indicated generally at point 50 in FIG. 11. It is at this point 50 in the path of rotation of the turret wheel 41 that the ferrules 47 receive the sections 2. To prevent the sections from passing through and beyond the ferrule 47 as they are propelled into the ferrules, a back stop plate 51 is mounted as shown in FIG. 11 of the drawing to lie immediately adjacent that face of the turret wheel 41 opposite the section feed side of the turret wheel 41.

The sections are expelled from the ferrules at a point 53 in the path of the section of the turret wheel 41 (see FIG. 10) after the section ends have been soldered and moved beyond the soldering station. An air blast line 55 is supported immediately adjacent point 53 as shown in FIG. 11 of the drawing. A continuous stream of air passes through the line 55 and as the section-loaded ferrule 47 approaches point 53, the air strikes the section to urge or expel it from the ferrule 47. A chute 57 catches the ferrules as they are discharged and conveys them to a suitable collecting unit (not shown).

As seen in FIG. 10, different or various size sections 2 may be carried by the same internal diameter ferrules 47 of the turret wheel 41. The sections 2 are carried in the ferrules 47 in a loose fit so that there is 1/32 of an inch or more play. This allows the sections 2 to rotate while they have the solder applied during the soldering operation. The ferrules 47 are flush with the turret wheel 41 on the injection side of the turret wheel 41.

To apply solder to the section 2 ends, the turret wheel 41 is adapted in its rotation to pass between a pair of directly opposed and spaced apart solder applying discs 60. (See FIGS. 1, 2, 10, 11, 11A and 12.) The turret wheel 41 is mounted in such relationship with the discs 60 that only the peripheral portion of the turret wheel 41 which houses the ferrules 47 rotates or passes between the soldering discs 60. The arrangement is such that the ends of the sections 2 contact the peripheries of the discs 60 and travel in an arcuate path across the surface of the disc peripheries as seen in FIGS. 10, 11 and 11A. The contact of the section 2 end with the solder disc 60 is sufficient to apply enough solder to get good contact with the foil of the section. In applying solder in the apparatus illustrated in the figures, a contacting wipe with the disc 60 periphery of the order of 5 to 8 inches in length will give a satisfactory application of solder. FIG. 11A shows a representation of the relative positioning of section 2, solder wheels 60 and the ferrule 47, when the section 2 is in contact with the wheels 60.

The discs 60 have sloped peripheries which provide a taper as seen in the side view of FIGS. 11 and 11A. The angle of this taper for the usual dimensions of small capacitor sections is in the range of from approximately 5–15°. The purpose of the disc taper is to effect a rotating motion of the capacitor sections as they travel across the disc peripheries. The contact of the disc peripheries with the end of the capacitor section is known as the "pitch-line." The pitch-line is tangent to the section surface farthest removed from the center of the turret wheel. As shown in FIG. 10, the rotating sections 2 rolling across the disc 60 peripheries describe an arc in the pitch-line by the orbit of the outermost point of the rotating section 2. It is necessary that the pitch-line describe an arc across the disc periphery which does not cross the center-line or axis of the solder disc 60. As seen in FIG. 10 the turret wheel 41 is rotating in a clockwise direction. In passing along the pitch-line the sections 2 approach, cross, and leave the disc 60 from right to left. The pitch-line described by these moving sections 2 describe the arc which extends from below the disc periphery to above the disc periphery in the direction of the path of travel. The pitch-line crosses the upper limit of the disc periphery before it crosses the centerline of the disc 60.

The section 2 must not travel in contacting relationship with the disc 60 peripheries beyond the centerlines of the discs 60 (FIG. 10) since a continued contact with the disc 60 peripheries as they move apart through rotation will tend to pull out the solder from the section 2 ends. At the same time, the sections 2 rotate as they move across the discs 60.

Figure 15:
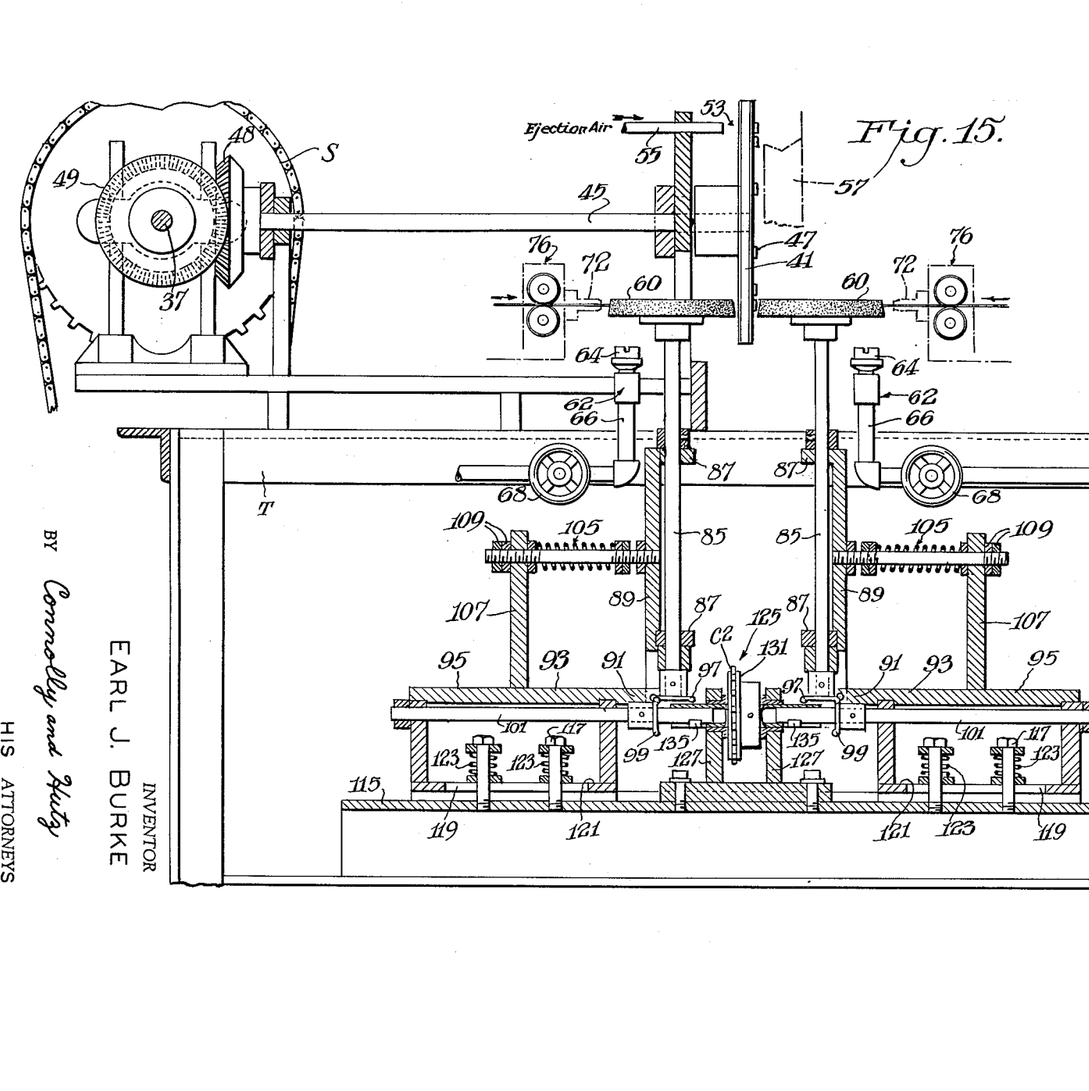
FIG. 15 is a side view partially in section of a portion of the soldering apparatus showing the manner in which the soldering stations are supported to provide a slight pivoting movement of the soldering stations and having lateral movement of the stations toward and away from each other.

As shown more clearly in FIG. 15 of the drawing, the discs 60 are preferably heated by gas heating means generally indicated at 62 which maintain the discs at a sufficiently high temperature to keep the solder in a suitably melted or softened condition. The burner nozzles 64 extend from gas feed pipes 66 in such a manner that they are directed toward the underside or bottom face of the discs. The gas feed pipes 66 are suitably secured in fixed manner to the table frame T and have hand valves 68 to regulate the gas flow to the nozzles 64.

Figure 13:
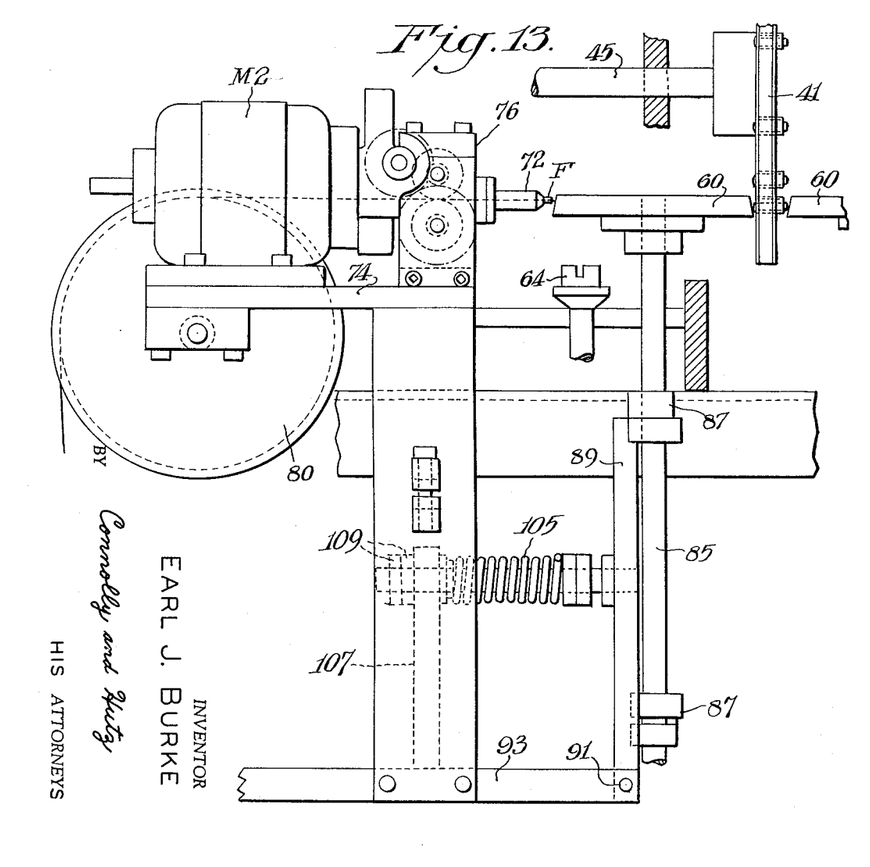
FIG. 13 is an elevation primarily showing the means for applying the solder to the soldering stations.
Figure 14:
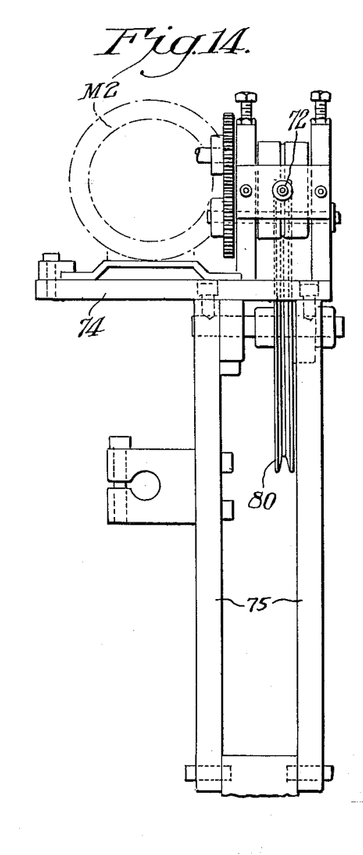
FIG. 14 is an end view of the solder applying means of FIG. 13.

As seen in FIG. 13, a solder filament F is applied to the periphery of each disc 60 through feed nozzles 72 supported by suitable platforms 74 which are in turn supported on vertical posts 75 supported in a manner hereinafter explained. The nozzles 72 are positioned so that they lie adjacent the periphery of each disc 60 as shown in FIGS. 13 and 14 of the drawing. As seen more clearly in FIGS. 13 and 14, each nozzle 72 is connected with a metering roll assembly generally indicated at 76 which is secured in fixed manner to the platforms 74. The metering roll assemblies 76 are driven from drive motors M2 also mounted to the platform 74 as shown in FIGS. 13 and 14. Grooved guide wheels 80 which rotate freely are also mounted on the platform 74 and serve to guide the solder filaments F leading from suitable supply stations (not shown on the drawing) into the metering roll assemblies 76 from which the filaments then pass through nozzles 72 and on to the peripheries of discs 60. The filaments F soften upon contact with the heated discs and the solder builds up upon the disc peripheries as the discs rotate.

In operation, the discs 60 are so mounted that they are urged apart slightly by the sections 2 when a section 2 passes between the discs. In other words, the clearance initially set between the peripheries of the discs is slightly less than the length of the sections 2 passing therebetween. This arrangement provides substantially firm contact between the ends of the sections 2 and disc 60 peripheries to provide excellent wiping action of the section 2 ends and the solder on the disc 60 peripheries. The discs then return to their original position as the section 2 passes beyond the discs.

To provide for this slight pivoting motion of the discs 60 and to rotate the discs at the desired rate of rotation, the discs are supported by rotatable shafts 85 journalled in suitable journals 87 secured to vertically disposed supports 89. As shown in FIG. 15, the vertically disposed supports 89 are in turn pivotally supported at 91 to the inner opposed ends of the top sections 93 of laterally movable frames 95, the purpose and operation of which will be discussed hereinafter. At the lower extremity of each disc drive shaft 85, there is secured a bevel gear 97 which meshes with bevel gears 99 supported on separate driven shafts 101 which are mounted for rotation in the movable frames 95. The teeth of these bevel gears are so machined that a slight pivoting action is permitted while the gears remain in mesh.

To resist the outward pivoting action of the disc shafts 85, spring tension rod assemblies generally indicated at 105 are urged against the vertical supports 89 which support the disc shafts 85. The spring tensioning assembles 105 are anchored at one end to the vertical supports 89 and are slidingly supported to their opposite ends in vertical posts 107 fixed to the top sections 93 of each movable frame 95.

The adjusting nuts 109 as shown are for alignment of the bottom faces of the soldered discs 60. The nuts against the springs 105 adjust the pressure in the tension of the soldered discs 60 on the section 2 as it passes between them. In other words, as seen in FIG. 1, nuts 109 are provided on the threaded bolt which carries the spring 105; and this bolt adjusts the soldered discs 60 by adjustment of the nuts 109. In effect, each soldered disc floats in its mounting. The spring 105 is set by a nut on the inner side of the spring. This adjusts the pressure on the spring. As the soldered disc 60 is floating, it is not limited in motion when the capacitor section rides over the disc taper. That is, the disc 60 is free to move until it meets the spring 105. With this arrangement, the discs 60 are permitted to move slightly away from each other when the sections 2 urge them apart and to return to their original position after each section 2 passes beyond the discs. As mentioned above, the pivoting action of the discs is slight.

The discs 60 are set with respect to each other by lateral adjustability. Thus the discs 60 may be set up so as to be separated initially at variable distances from each other. In this manner the initial clearance between the discs 60 is adjustable to accommodate different lengths of capacitors soldered in the apparatus. As described above, the shafts 85 for the soldering discs 60 are supported by vertical supports 89. The supports 89 in turn are fixed to move frames 95. As shown in FIG. 15, each frame 95 is slidingly mounted on the permanent member 115 by bolts 117 which extend along elongated slots 119 in the bottom section 121 of the movable frame 95. Spring tension means 123 between the heads of bolts and the bottom section 121 of each frame urge the movable frames 95 against the permanent member 115 to hold the frames in position; in turn they are moved by the frame positioning assembly which will be hereinafter described.

Figure 17:
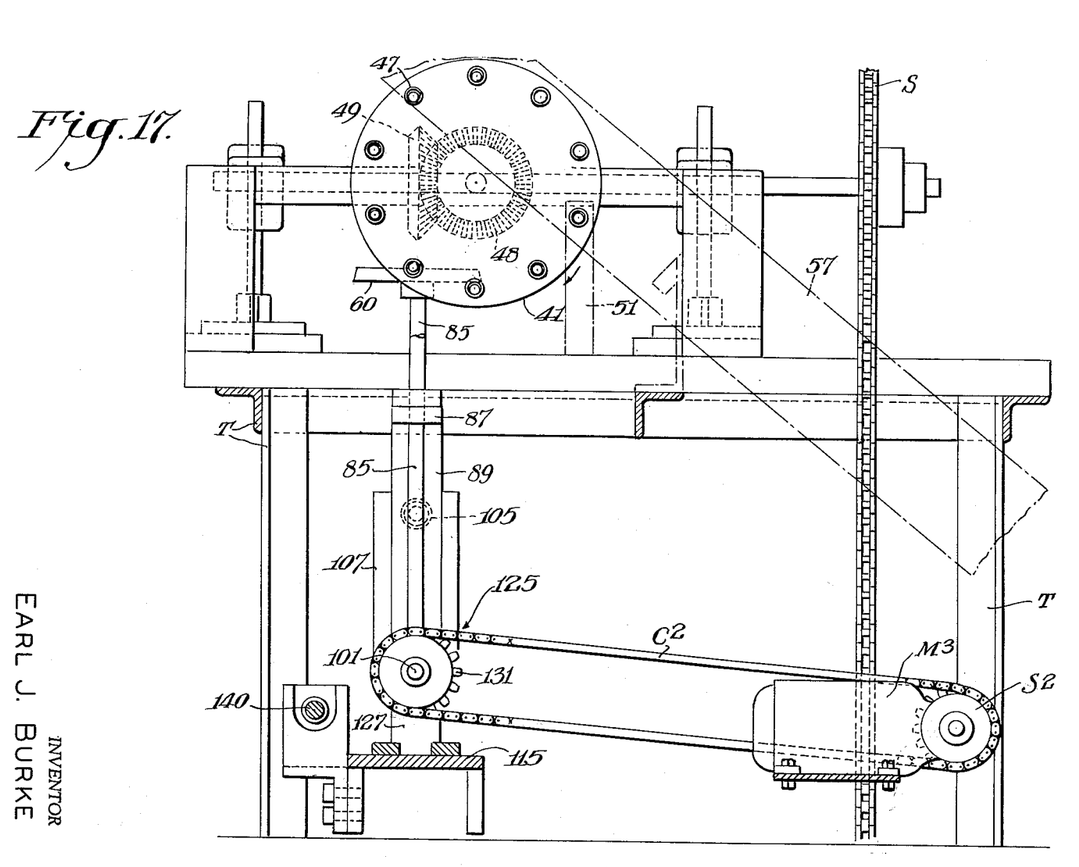
FIG. 17 is an elevation partially in section of the main drive assembly for rotating the solder application discs and the article conveying means which carries the articles between the soldering stations.

A central driving gear assembly 125 is rotatably supported in journal supports 127 secured in fixed manner to the permanent member 115. The central driving gear assembly drives the shafts 101 which are supported in the respective movable frames 95. The shafts 101 in turn drive the disc shaft 95 through bevel gears 97, 99. The drive assembly 125 is shown supported at a point between the two movable frames 95. A hollow stub shaft 129 supports a drive wheel or sprocket 131 which in turn is driven by a chain C2 and sprockets S2 connected to a motor M3 as shown in FIG. 17. The drive members are supported on the table frame T. The stub shaft 129 has internal keyways 135 at the extremities of the shaft and the driven shafts 101 are telescopically and slidingly supported within the hollow ends of the stub shaft 129 at the rotation of which they are connected by the keyways 135. The driving force is thus delivered, as shown in FIG. 15, through the sprocket 131 to the stub shaft 129 and the driven shafts 101 respectively. With this arrangement, the frames 95 may be moved toward or away from each other while still maintaining a drive connection between the stub shaft 129, the driven shafts 101, and the disc shafts 85 through bevel gears 97, 99. The vertical supports 89 for the disc shafts 85 will move with the frames 95 in view of spring tensioning means 105 anchored to the vertical supports 89 and posts 107 supported in fixed manner to the top of each frame 95.

Figure 16:
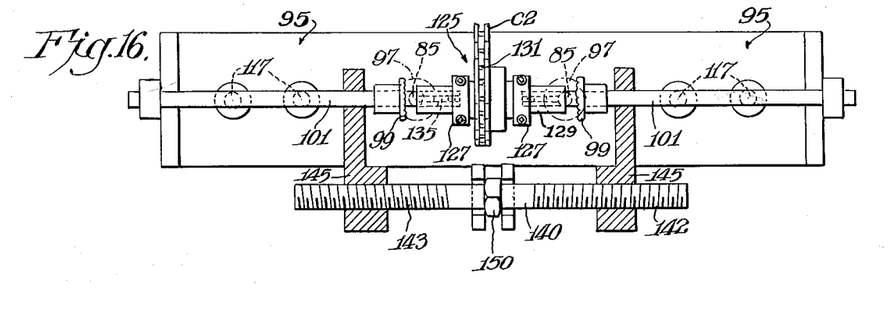
FIG. 16 is a detail of the means for controlling the lateral movement of the soldering stations.

The frames 95 are moved simultaneously through operation of an adjustable screw 140 (FIG. 16) which has opposed directional thread tracks 142 and 143 on the opposite ends of the adjusting screw 140. Each track is threaded through connecting elements 145 which are secured to the top sections 130 of the movable frames 95 as shown in FIG. 16. By rotating the nut 150 secured in fixed manner to the middle portion of the adjustable screw 140 in the desired direction, the connecting members 145 will be moved outwardly away from each other or inwardly toward each other depending upon the direction of rotation of nut 150 to correspondingly move the frames 95. Through the above-described connecting structure, the discs can be moved apart or brought together as desired and fine adjustment of the disc clearance may be achieved.

The vertical posts 75, as shown in FIGS. 13 and 14, which support the platforms 74 to which the solder feed elements are secured are also fixed to the top sections 93 of the movable frames 95 so that the solder feed assembly moves with the discs.

In operation, first referring to FIG. 3, the sections 2 travel in progressive manner from the vibratory supply feed hopper 1 into the feed tube 9 supported upon the feed track 8. Vibratory motion is transferred to the spring-mounted feed track 8 through a resilient bumper 14 secured to the end of the track 8 and which lies in contact with the supply hopper 1.

The sections 2 pass from the hopper 1 into the feed tube 9 as described above. In the feed tube 9 the vibratory action advances the sections 2 down the tube 9 to the kick-off point shown in FIG. 7. The further movement of any particular section 2 depends upon the conditions further down the tube. In accordance with the operation of the pneumatic action described above, the section 2 is held at the kick-off point for its respective advancement into its respective ferrule 47. The sections are thus progressively propelled in a timed manner into the turret wheel 41.

The turret wheel 41 progressively receives the sections 2 in the ferrules 47. The sections 2 and the turret wheel 41 are proportioned so that the sections extend through the thickness of the wheel to protrude at their ends on both sides of the turret wheel 41. The turret wheel 41 in its constant rotation carries each ferrule-housed capacitor down and around and into contact with the discs 60 as shown particularly in FIGS. 10, 11, 12, 15 and 17. The section passing between the pair of closely spaced soldering discs 60 contacts the periphery of each disc with its respective ends. The ends of the sections contacting the disc periphery rotate in traveling across the face of the periphery. The path of the section in crossing the disc peripheries is arcuate extending from the angle of the periphery with the bottom face of the disc toward an angle of the periphery with the top face of the disc. Stated otherwise the section moves from the bottom edge toward the top edge of the periphery in traveling across the periphery with an arcuate path and rotating as it moves. This path of contact between the section end and the disc periphery establishes a wiping contact between the disc periphery and the section to assure an even and uniform distribution of solder on the disc end. As pointed out above, the section end disengages from contact with the disc periphery before the section crosses the line between the axes of the two discs. This centerline is also perpendicular to the plane of rotation on the turret wheel 41. By timing the disengagement of the end from the periphery in advance of its intersection with the centerline, the section end makes a clean break from the fluid solder on the periphery and avoids the tendency of the section to pull solder from the peripheries. It will be understood that the fluid solder has a substantial viscosity. The section end in contact with the periphery and inserted against the solder makes use of this viscosity in obtaining a properly even and uniform distribution of the solder on the section end. The solder clings to the section and the tackiness of the solder can cause it to string out in the separation of the end from the disc. This stringing out is avoided by the operation of this invention as described.

The disc rotates at a speed to apply a necessary but not excessive amount of solder to the section end. The rotation speed, therefore, depends upon the amount of solder to go on the section. The length of wipe of the section end on the solder periphery is sufficient to get contact with the end of the convolutely wound section and to cap the section with solder. An excessive amount of wipe and accumulation of solder is objectionable. This is known as pile-up. The solder is most easily controlled by the rate of rotation of the turret wheel. The overlap or positioning of the solder wheels with relation to each other also affects the application of solder on the section ends. Temperature is also a factor in the control of solder. It is noted that large sections require more spring pressure of the discs against the sections than do the smaller sections so that in this way the section size is also a factor, and the adjustability of the disc in its relationship to the turret wheel is an important feature of this invention. The clearance between the discs peripheries is smaller than the length of the capacitor sections. This causes the discs to be forced apart by the sections as they pass therebetween to insure a good wiping contact. As described above, the soldering discs are heated and the solder film applied to the periphery of the heated disc. This is the solder which is picked up or wiped from the disc periphery by the section ends as they pass across the face of the disc peripheries. After leaving the upper edges of the disc peripheries, the sections travel, during which period of travel the solder solidifies. An air expulsion means blasts the end-soldered section from its ferrule when the ferrule has reached its point for discharge from the turret wheel.

The above described apparatus and method are illustrative of the invention. Additions and modifications may be made. For example, a photocell may be employed to stop the vibration of the hopper. The photocell control is attached at the tube 9 to be actuated by the passage of sections through the tube 9. The tube 9 is translucent in the area opposite the photocell. In the photocell attachment, a beam is projected across the tube 9 at the apertures 151. The photocell, when actuated by a section remaining in the zone of the apertures 151, will turn off the vibratory hopper 1. As mentioned in connection with FIGS. 7–9, the delivery of the air from the pneumatic means into the ejection end of the tube 9 can be projected at various angles less than ninety degrees but preferably is not directed vertically into the feed tube at a ninety degree angle. Further, it is noted that the application of solder as described in the above embodiment shows simultaneous application to both ends of a capacitor section. This is the preferred method for the conventional capacitor section. However, it will be understood that single ended soldering of one end at a time is possible with this invention. The adaptability of this machine to soldering one end at a time is an advantageous feature.

The means for passing the capacitor sections across the solder applying discs has been illustrated by the preferred embodiment in a turret wheel carrying ferrules. It will be understood that any device that will take the section into the area between the solder discs and take it out again without crossing the centerline will be satisfactory. For example, a chain device may carry the capacitor sections; and, further, the capacitor sections may be moved into and out of contact with the soldering discs by a reciprocating motion so that the invention is not limited to a one-direction continuous motion in the movement of the capacitor sections across the solder discs.

Another feature of this invention is found in the flexibility of the feed characteristics of the stationary feed means. The feed tube is also fixed in position and does not have to shift to match the variation of the various sections in the turret wheel. The variations in capacitor sections can be taken care of by adjustments of the solder wheel and the rate of rotation of the turret wheel and other adjustments in connection with the soldering.

It will be understood that the gating means for producing the intermittent air flow described above, particularly in connection with FIGS. 7–9, may be modified without stopping the pneumatic action entirely. As long as the apertures are provided in the feed tube at a point more removed from the end of the tube than the joint with the air line, there will be a kick-off point. However, the reversal of air flow through the apertures is highly advantageous in feeding capacitor sections to the turret wheel. One of the purposes of these apertures is to allow the air in the feed tube to escape during that period when a section blocks the tube end in awaiting for the next empty ferrule. The air flow reversal occurs when the gating action causes an intake of air rather than an exhalation of air. As pointed out above, the intake of air through the apertures in this phase is preferably adjusted so that it is just enough to allow the next succeeding sections at the kick-off point to remain stationary. The advantage of this feeding means lies in the fact that the sections are handled carefully. Some sections have extended foil margins which would be deformed by undue pressure against the turret wheel. The escape of air through the apertures relieves such pressure so that there will not be a jamming of the section against the turret wheel; and, when the shutter valve is open, there is an intake at the end of tube 9 which sucks the section 2 away from the turret wheel.

It is a further feature of this invention that a great variety of convolutely wound capacitor sections can be processed according to the principles of this invention and satisfactorily soldered. Also, extended foil sections are particularly well handled by this invention. The soldering that is effected is better than by hand.

From the above description, it is obvious that a new and novel soldering apparatus for soldering the ends of cylindrical objects such as capacitors has been invented. The prior time-consuming and expensive hand soldering methods can now be done away with in view of the above-described apparatus. Approximately 5,000 capacitors may be processed per hour with the above-described apparatus.

Obviously, many modifications and variations of the present invention are possible in the light of the above teachings. It is, therefore, to be understood that within the scope of the appended claims, the invention may be practiced otherwise than as specifically described.

What is claimed is:

1. A soldering apparatus for applying solder to fragile articles comprising in combination a member rotatable about a first axis, means positioned circumferentially in said rotatable member for supporting said fragile articles, a soldering disc on each side of said rotatable member, each disc being rotatable on an axis normal to the first axis of rotation of said rotatable member, a surface on each of said rotatable soldering discs for contact with an article and said soldering discs provided with solder supply means and the end of said fragile articles positioned in said rotatable member being contactable with the disc surface at one side of the axis of rotation of the disc and being disengageable therefrom before crossing the axis of rotation.

2. A soldering apparatus for simultaneously soldering both ends of fragile cylindrical articles such as convolutely wound capacitor sections comprising a table frame, two directly opposed and spaced soldering stations supported by said frame, article conveying means supported by the table frame and operating between the opposed soldering stations for bringing the article between the stations to contact the ends with the soldering stations, article feeding means supported by the frame for supplying the articles to the conveying means, means for mounting the soldering stations on the frame in yieldable relation to each other so that the articles move the soldering stations on passing between the stations, means attached to the frame for transferring articles from the feeding means to the conveying means, and means for removing the articles from the conveying means.

3. A soldering apparatus for simultaneously soldering in finished form both ends of cylindrical articles such as capacitor sections which are fed in progressive manner to the apparatus comprising a table frame, two directly opposed and spaced apart rotatable solder-applying discs with their faces parallel to the top of the table frame, vertically disposed driving shafts supported by the main frame for rotating the soldering discs, heating means supported by the main frame adjacent the soldering discs for heating the discs, a solder supply assembly supported by the frame adjacent the periphery of each disc for supplying solder to each disc periphery, article conveying means supported by the frame and operating between the soldering discs for progressively bringing the articles between the discs with the article ends in contact with the soldering disc peripheries, and article feeding means attached to the table for supplying the articles to the conveying means.

4. A soldering apparatus for simultaneously soldering in finished form both ends of cylindrical articles such as capacitor sections which are fed in progressive manner to the apparatus comprising a table frame, a turret wheel rotatably supported on the table frame which wheel supports the articles, a pair of substantially parallel directly opposed soldering disc rotatably supported by the table frame, means for heating the discs attached to the frame adjacent the discs, solder-feeding means attached to the frame adjacent the discs for applying solder to the disc peripheries, said wheel and discs being so supported that the peripheral portion of the wheel passes between the disc peripheries to bring the article ends into contact with the disc peripheries with the article axis substantially parallel to the plane of rotation of the discs, article support means located around the peripheral portion of the wheel, the path of travel of said article support means between said discs extending only to the center line of said discs and means for feeding the articles to said turret wheel.

5. A soldering apparatus for simultaneously soldering in finished form both ends of cylindrical articles such as capacitor sections which are fed in progressive manner to the apparatus comprising a table frame, two directly opposed and spaced apart solder-applying discs with the disc faces lying substantially parallel to the top of the table frame, vertically disposed shafts supported by the frame for rotating the soldering discs in opposite directions at the same rate of rotation, heating means attached to the table frame adjacent the soldering discs for heating the discs, a solder supply assembly supported adjacent the periphery of each disc for supplying solder to each disc periphery, a turret wheel with its axis at substantially right angles to the soldering disc axes, a rotatable shaft mounted on the table frame for driving the wheel, ferrule supports for the articles which ferrules extend through the turret wheel around the peripheral portion of the wheel and which lie parallel to the turret wheel axis, said turret wheel being so mounted with respect to the soldering discs that the peripheral portion of the wheel which houses the ferrules passes between the discs to bring the articles housed in the ferrules between the disc peripheries with the article ends in contact with the disc peripheries, the path of travel of said ferrules between said discs extending only to the center line of said discs, article feeding means secured to the frame for supplying the articles to the ferrules of the turret wheel, and means attached to the frame adjacent the wheel for ejecting the articles from the ferrules after the article ends have been soldered.

6. A soldering apparatus for simultaneously soldering in finished form both ends of cylindrical articles such as capacitor sections which are fed in progressive manner to the apparatus comprising a table frame, two directly opposed and spaced apart soldering discs, rotatable shafts supported by the table for rotating the discs in opposite directions and at the same rate of rotation, said disc faces lying parallel to the table top, heating means mounted on the table adjacent each soldering disc for heating the discs, a solder supply assembly supported by the table adjacent each disc for supplying solder to each disc periphery, a turret wheel with its axis lying at substantially right angles to the axes of the soldering discs, a drive shaft supported by the frame for driving the wheel, article ferrule supports extending through and around the turret wheel peripheral portion to lie parallel to the turret wheel axis, said turret wheel being so mounted with respect to the soldering discs that only the peripheral portion of the wheel which houses the ferrules passes between the soldering discs, the path of travel of the articles between the discs extending only to the centerline of the discs, a feed hopper for the articles, means for vibrating the hopper, a spring-mounted article feed rail mounted on the frame and lying between the vibratory hopper and the turret wheel at substantially a right angle to the face of the turret wheel with the ends of said rail lying adjacent the turret wheel and the hopper, a bumper connected with the rail and in contact with the hopper whereby a vibratory motion is transmitted to the rail, a capacitor section feed tube loosely supported by the rail, an air line communicating with the feed tube at the discharge end thereof, the discharge end of said tube being in alignment with the path of travel assumed by the ferrules, timing means connected with the air line assembly for selectively introducing air under pressure into the feed tube to propel in timed manner an article within a ferrule of the turret wheel, and means for expelling the articles from the ferrules of the turret wheel after the article ends have been soldered.

7. A soldering apparatus for simultaneously soldering in finished form both ends of cylindrical articles such as capacitor sections which are fed in progressive manner to the apparatus comprising a table frame, a pair of opposed and spaced apart soldering discs mounted upon rotatable shafts which are supported by the main frame with the faces of the discs lying parallel with the top of the table frame, said discs rotating in opposite directions at the same rate of rotation, means secured to the table frame for heating the discs, means supported by the frame for continuously supplying solder to the disc peripheries, a rotatable turret wheel mounted on the table frame with its axis at substantially right angles to the soldering disc axes and so that the peripheral portion of the wheel rotates between the discs, the path of travel of said articles extending only to the centerline of the discs, a plurality of ferrule article supports which are shorter than the articles, extending through the wheel and around the peripheral portion of the wheel and with their axes in alignment with the wheel axis, said peripheral portion of the wheel traveling between the discs being such that ends of the articles housed in the ferrules will contact the disc peripheries, said disc peripheries tapering inwardly as they extend toward the upper face of the disc, means supported by the frame for urging the discs toward one another whereby they are slightly moved apart as the ends of the article contact the disc periphery, said articles traveling in an arcuate path across the face of the disc peripheries whereby the articles are rotated as they travel across the disc peripheries, article feeding means supported by the table frame and located adjacent one face of the turret wheel and in alignment with the path of travel assumed by the ferrules, means connected with the feed means for transferring the articles from the feed means to the ferrules of the turret, and article expulsion means supported by the table frame adjacent the article feed side of the turret wheel and in alignment with the path of travel assumed by the ferrules for removing the articles from the ferrules after the article ends have been soldered.

8. A soldering apparatus according to claim 7 wherein the article feeding means comprises a spring-mounted article rail which receives the articles in progressive manner from the hopper, said rail lying between the hopper and the article conveying means with the ends of the rail lying adjacent the hopper and conveying means, means attached to the rail and contacting the hopper for transmitting a vibratory motion to the rail, and a feed tube for the articles supported by the rail, and the article transfer means comprises an air line which communicates with the feed tube at the discharge end thereof, and timing means connected with said air line and supported by the frame for selectively introducing air under pressure into the tubing to propel in a timed manner an article from the tube to the turret wheel.

9. A soldering apparatus according to claim 8 wherein the opposite end of said air line opens into a main air supply line which terminates and opens into the atmosphere at a point beyond that point of connection of the air line and the main air line, a rotatable blade wheel having spaced apart radially extending blades, a rotatable shaft for supporting said blade wheel, said blade wheel being so mounted with respect to the main air line that the spaced blades intersect the line at a point between the discharge end of the main air supply line and the point of joining of the air line with the main line to periodically block off the supply of air through the main line whereby air passes periodically into the air line and feed tube.

10. A soldering apparatus according to claim 8 comprising pivotal mountings for connecting the vertical supports for the soldering disc shafts with the laterally movable frame, a separate driven shaft supported by each movable frame, a bevel gear secured to each driven shaft adjacent the inner end of the shaft, a drive gear supported between the frames, a hollow stub shaft supported by the drive gear to extend beyond either side of the drive gear, a keyway within each end of the hollow stub shaft, the inner ends of the two driven shafts being slidingly and telescopically supported in drive connection within each end of the hollow stub shaft, a bevel gear secured to the lower extremity of each soldering disc shaft which gears mesh with the bevel gears of the driven shafts of the movable frames, said bevel gears having teeth of such design that the soldering disc shafts may slightly pivot with their pivotally mounted vertical supports when the soldering discs are forced apart by the action of the cylindrical article against the discs as the article passes between the discs, a vertical fixed post secured to the top of each movable frame adjacent the outer end thereof, and spring tension means connecting the vertical soldering disc shaft supports with the fixed posts to provide a resisting action against any pivoting movement of the soldering disc shafts and their vertical supports.

11. A soldering apparatus according to claim 10 comprising a vertical support secured to the top of each movable frame, a platform secured to each support, a solder filament metering roll assembly secured to that end of each platform adjacent the soldering disc, a drive motor secured to each platform for driving the metering roll assembly, a guide roll for the solder filament secured to the opposite end of each platform, a solder filament supply roll support secured at each end of the table frame, and a solder filament feed nozzle extending from each metering roll assembly toward the periphery of the soldering disc to lie immediately adjacent the soldering disc periphery.

12. A soldering apparatus according to claim 9 comprising a back-stop plate mounted on the table frame adjacent the side of the turret wheel opposite the aspirator side and in alignment with the discharge end of the feed tube to prevent the article propelled into the ferrule from passing through and beyond the ferrule, an air expulsion line attached to the frame on the feed tube side of the turret wheel with the discharge end of the line so positioned as to intersect the path of travel of the ferrules as the turret wheel rotates to discharge the article from the ferrule after the article ends have been soldered, and an article discharge chute mounted on the table frame on the back-stop side of the turret wheel and in alignment with the air expulsion line to receive the articles as they are discharged from the ferrules of the turret wheel.

13. A soldering apparatus according to claim 7 comprising separate vertical supports for the vertically positioned rotatable shafts of the soldering discs, each vertical support being secured at its lower extremity to the inner end of one of a pair of opposing and spaced apart frames, said frames being slidingly secured to a fixed base support in turn secured to the lower portion of the table frame, and means connected with the movable frames for simultaneously moving the frames toward and away from each other to correspondingly move the vertical supports for the soldering disc shafts toward and away from each other.

14. A soldering apparatus for simultaneously soldering in finished form both ends of cylindrical articles such as capacitor sections which are fed in progressive manner to the apparatus comprising a table frame, two directly opposed and spaced apart solder-applying discs with the disc faces lying substantially parallel to the top of the table frame, vertically disposed shafts supported by the frame for rotating the soldering discs in opposite directions at the same rate of rotation, heating means attached to the table frame adjacent the soldering discs for heating the discs, a solder supply assembly supported adjacent the periphery of each disc for supplying solder to each disc periphery, means for passing the cylindrical articles between the solder wheels, supports for the articles in said means, said means being so mounted with respect to the soldering discs that the articles support means pass between the discs to bring the articles supported thereon between the disc peripheries with the article ends in contact with the disc peripheries, the path of travel of said article supports between said discs extending only to the centerline of said disc, and article feeding means secured to the frame for supplying the articles to the article supports.

15. In a soldering apparatus as claimed in claim 14, a means for passing the cylindrical articles between the solder discs consisting of chains carrying article supports.

16. A soldering apparatus for applying solder to fragile articles comprising in combination a member rotatable in a plane about a first axis, means positioned circumferentially in said rotatable member for supporting said fragile articles, at least one soldering disc adjacent said rotatable member and rotatable on an axis normal to the first axis of rotation of said rotatable member, a surface on said rotatable soldering disc for contact with an end of said fragile articles, said soldering disc provided with solder supply means and the said end of said fragile articles positioned in said rotatable member being contactable with the disc surface at one side of the axis of rotation of the disc and being disengageable therefrom before crossing the radius of the disc normal to the plane of rotation of the rotatable member.

References Cited in the file of this patent

UNITED STATES PATENTS

| | | |
|---|---|---|
| 1,058,439 | Karp | Apr. 8, 1913 |
| 1,651,399 | Madden | Dec. 6, 1927 |
| 1,847,737 | Weiser | Mar. 1, 1932 |
| 1,910,713 | Prussing | May 23, 1933 |
| 1,946,428 | Preston et al. | Feb. 6, 1934 |
| 2,072,840 | Temple | Mar. 2, 1937 |
| 2,419,484 | Danziger | Apr. 22, 1947 |
| 2,510,463 | Danziger | June 6, 1950 |
| 2,701,545 | Scherer | Feb. 8, 1955 |
| 2,798,585 | Bailey et al. | July 9, 1957 |
| 2,858,930 | Aidlin | Nov. 4, 1958 |